(12) United States Patent
Walsh et al.

(10) Patent No.: US 11,019,763 B2
(45) Date of Patent: Jun. 1, 2021

(54) DECK LIFT ASSEMBLY FOR A RIDING LAWN CARE VEHICLE

(71) Applicant: HUSQVARNA AB, Huskvarna (SE)

(72) Inventors: Martin J. Walsh, Charlotte, NC (US); Braxton Reese, Charlotte, NC (US)

(73) Assignee: HUSQVARNA AB, Huskvarna (SE)

( * ) Notice: Subject to any disclaimer, the term of this patent is extended or adjusted under 35 U.S.C. 154(b) by 28 days.

(21) Appl. No.: 16/480,344

(22) PCT Filed: Jun. 22, 2018

(86) PCT No.: PCT/IB2018/054631
§ 371 (c)(1),
(2) Date: Jul. 24, 2019

(87) PCT Pub. No.: WO2018/235052
PCT Pub. Date: Dec. 27, 2018

(65) Prior Publication Data
US 2019/0373798 A1    Dec. 12, 2019

Related U.S. Application Data

(60) Provisional application No. 62/524,259, filed on Jun. 23, 2017.

(51) Int. Cl.
*A01B 63/00* (2006.01)
*A01D 75/00* (2006.01)
*A01D 101/00* (2006.01)

(52) U.S. Cl.
CPC ............ *A01B 63/008* (2013.01); *A01D 75/00* (2013.01); *A01D 2101/00* (2013.01)

(58) Field of Classification Search
CPC .. A01B 63/008; A01D 75/00; A01D 2101/00; A01D 34/74; A01D 34/54; A01D 34/64; A01D 34/82; A01D 34/006; A01D 34/661; A01D 67/00
USPC ..................... 56/320.1, 15.9, 14.7, 17.1, 208
See application file for complete search history.

(56) References Cited

U.S. PATENT DOCUMENTS

| | | | |
|---|---|---|---|
| 3,918,240 | A | 11/1975 | Haffner et al. |
| 5,138,825 | A | 8/1992 | Trefz et al. |
| 5,927,055 | A | 7/1999 | Ferree et al. |
| 6,494,028 | B2 | 12/2002 | Moore |
| 6,837,032 | B1 | 1/2005 | Swartzendruber et al. |

(Continued)

OTHER PUBLICATIONS

International Search Report and Written Opinion for International Application No. PCT/IB2018/054631 dated Oct. 23, 2018.

*Primary Examiner* — Thomas B Will
*Assistant Examiner* — Matthew Ian Neal
(74) *Attorney, Agent, or Firm* — Burr & Forman, LLP

(57) ABSTRACT

A riding lawn care vehicle may include a frame, a power unit, and a cutting deck. The frame may be operably coupled to wheels of the riding lawn care vehicle. The power unit may be operably coupled to the wheels to provide drive power to the wheels. The cutting deck may be selectively powered by the power unit and operably coupled to the frame via a height adjustment assembly. The height adjustment assembly may be configured, based on actuation of an operating assembly, to be selectively transitioned into and out of a locked state in which the cutting deck is retained at a selected height, and selectively transitioned out of a transport mode.

17 Claims, 9 Drawing Sheets

(56) References Cited

U.S. PATENT DOCUMENTS

| | | | |
|---|---|---|---|
| 7,003,937 B1* | 2/2006 | Tarver | A01D 34/74 56/17.1 |
| 7,318,311 B2* | 1/2008 | Wright | A01D 34/74 56/17.1 |
| 7,434,379 B2* | 10/2008 | Nogami | A01D 34/74 56/17.1 |
| 7,540,134 B1 | 6/2009 | Reich | |
| 7,578,117 B2 | 8/2009 | Shaffer et al. | |
| 9,591,803 B1* | 3/2017 | Covington | A01D 34/82 |
| 2002/0011059 A1 | 1/2002 | Moore | |
| 2002/0088217 A1 | 7/2002 | Dennis | |
| 2008/0034723 A1 | 2/2008 | Wright et al. | |
| 2008/0190087 A1 | 8/2008 | Elhardt et al. | |
| 2008/0229725 A1 | 9/2008 | Shaffer et al. | |
| 2014/0083069 A1 | 3/2014 | Berglund | |
| 2014/0083070 A1* | 3/2014 | Berglund | A01D 34/74 56/14.7 |
| 2014/0250851 A1* | 9/2014 | Jonsson | A01D 34/64 56/320.1 |
| 2014/0260162 A1 | 9/2014 | Lanscater | |
| 2020/0329637 A1* | 10/2020 | Clontz | A01D 34/82 |

* cited by examiner

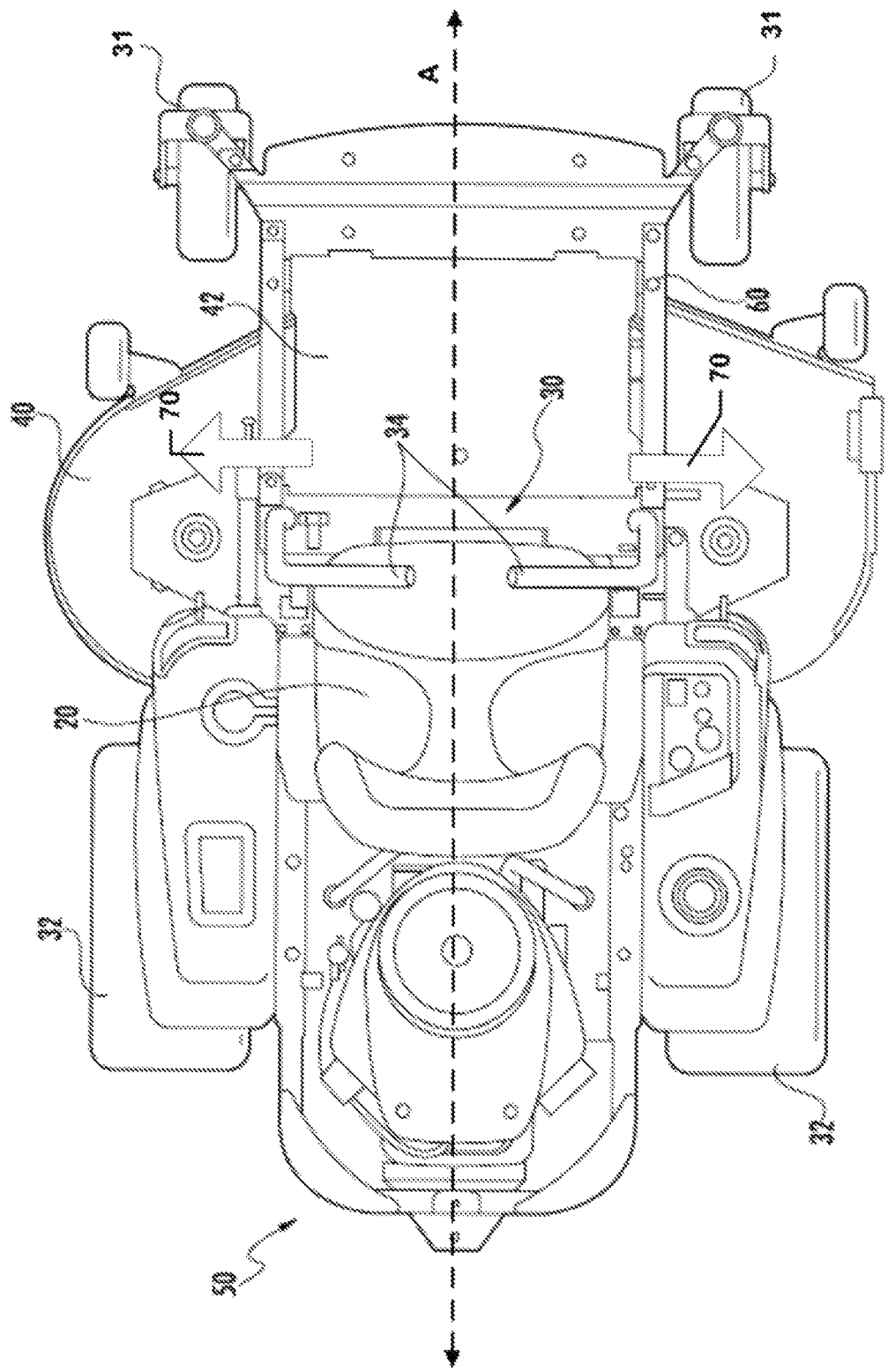

DECK LIFT ASSEMBLY FOR A RIDING LAWN CARE VEHICLE

CROSS REFERENCE TO RELATED APPLICATION

This application claims priority to U.S. application No. 62/524,259 filed Jun. 23, 2017, the entire contents of which are hereby incorporated by reference in its entirety.

TECHNICAL FIELD

Example embodiments generally relate to lawn care vehicles and, more particularly, to riding lawn care vehicles with cutting decks that may be lifted for transport or changing cutting height.

BACKGROUND

Lawn care tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines, and are relatively inexpensive. Meanwhile, at the other end of the spectrum, riding lawn mowers, such as lawn tractors, can be quite large. Riding lawn mowers can sometimes also be configured with various functional accessories (e.g., trailers, tillers, and/or the like) in addition to grass cutting components. Riding lawn mowers provide the convenience of a riding vehicle as well as a typically larger cutting deck as compared to a walk-behind model.

By their very nature, riding lawn mowers include cutting decks that may house one or more cutting blades. These cutting decks may be configured to have adjustable heights in order to allow the user to select a desired length of vegetation that has been cut, or otherwise transition the cutting deck into a storage or transport position. The heights may be adjustable via a number of different mechanical arrangements. However, a persistent problem is often experienced in that it can be difficult to strike a balance between ease of operation of a height adjustment assembly and the robustness or stability of the height adjustment assembly. This problem can be exacerbated by the fact that engine vibration and rough terrain may tend to expose the height adjustment assembly to constant and potentially significant forces that could easily loosen or even reposition the cutting deck height settings under certain circumstances.

Accordingly, it may be desirable to provide a convenient to use, and yet structurally robust and effective mechanism by which to adjust cutting deck height.

BRIEF SUMMARY OF SOME EXAMPLES

Some example embodiments of the present invention provide a deck lift assembly that is both robustly designed and easy to use. Some example embodiments may provide operators with the ability to use a multi-purpose operating assembly to lock and unlock a height adjustment assembly for the cutting deck and transition into and out of a transport mode.

In one example embodiment, a riding lawn care vehicle is provided. The riding lawn care vehicle may include a frame, a power unit, and a cutting deck. The frame may be operably coupled to wheels of the riding lawn care vehicle. The power unit may be operably coupled to the wheels to provide drive power to the wheels. The cutting deck may be selectively powered by the power unit and operably coupled to the frame via a height adjustment assembly. The height adjustment assembly may be configured, based on actuation of an operating assembly, to be selectively transitioned into and out of a locked state in which the cutting deck is retained at a selected height, and selectively transitioned out of a transport mode.

In another example embodiment, a height adjustment assembly of a riding lawn care vehicle is provided. The riding lawn care vehicle includes a frame operably coupled to wheels of the riding lawn care vehicle, and a cutting deck operably coupled to the frame via the height adjustment assembly. The height adjustment assembly includes an operating assembly that is actuatable to selectively transition the height adjustment assembly into and out of a locked state in which the cutting deck is retained at a selected height, and selectively transition the height adjustment assembly out of a transport mode.

Some example embodiments may improve an operator's experience in relation to the ease of changing cutting deck height of a lawn care vehicle during operating and/or transporting of the vehicle, while retaining a robust and stable feel. The user experience associated with operating and transporting the riding lawn care vehicle may therefore also be improved.

BRIEF DESCRIPTION OF THE SEVERAL VIEWS OF THE DRAWING(S)

Having thus described some embodiments of the present invention in general terms, reference will now be made to the accompanying drawings, which are not necessarily drawn to scale, and wherein:

FIG. 1B illustrates a top view of the riding lawn care vehicle according to an example embodiment;

DETAILED DESCRIPTION

Figure 1A:
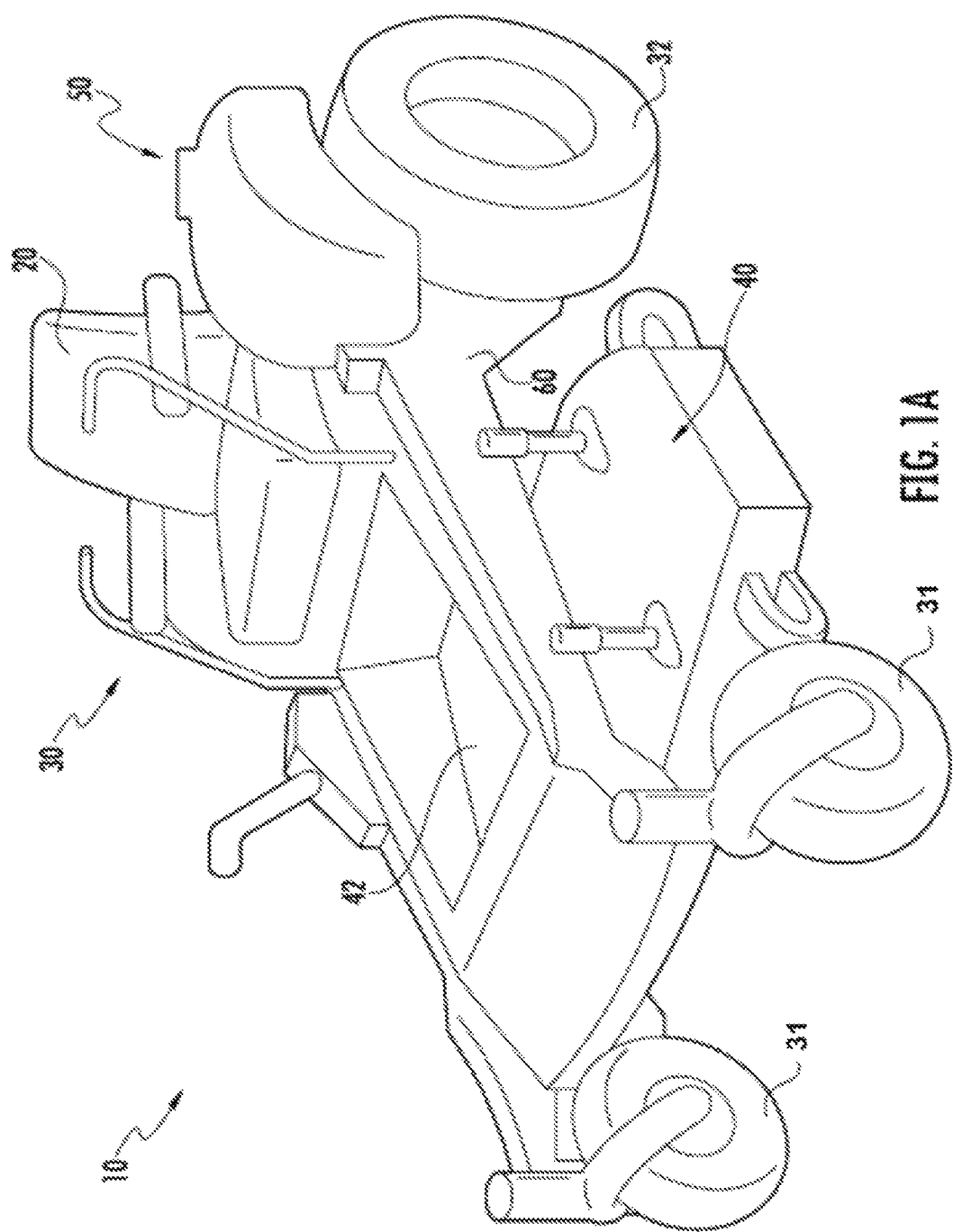
FIG. 1A illustrates a perspective view of a riding lawn care vehicle according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, the phrase "operable coupling" and variants thereof should be understood to relate to direct or indirect connection that, in either case, enables functional interconnection of components that are operably coupled to each other.

Some example embodiments may improve the ability of an operator to adjust the cutting height of a riding lawn care vehicle. In this regard, some example embodiments may provide a height adjustment assembly that allows the operator to conduct mode/state changes relative to cutting deck height adjustment with a single operating assembly. In this regard, for example, the operating assembly may include a two part-pedal assembly, where one part (or one pedal) may control state/mode shifts, and the other may control the actual selection of height of the cutting deck.

FIG. 1, which includes FIGS. 1A and 1B, illustrates a riding lawn care vehicle 10 according to an example embodiment. FIG. 1A illustrates a perspective view of the riding lawn care vehicle 10, and FIG. 1B illustrates a top view of the riding lawn care vehicle 10 according to an example embodiment. The riding lawn care vehicle 10 of FIGS. 1A and 1B may be recognized as an example from a class of riding lawn mowers that is often referred to as a "zero turn" mower. However, example embodiments may also be practiced on other vehicles as well.

In some embodiments, the riding lawn care vehicle 10 may include a seat 20 that may be disposed at a center, rear, or front portion of the riding lawn care vehicle 10. The riding lawn care vehicle 10 may also include a steering assembly 30 (e.g., a set of steering levers or the like) functionally connected to wheels 31 and/or 32 of the riding lawn care vehicle 10 to allow the operator to steer the riding lawn care vehicle 10. The operator may sit on the seat 20, which may be disposed to the rear of the steering assembly 30 to provide input for steering of the riding lawn care vehicle 10 via the steering assembly 30. However, some models may be stand-up models that eliminate the seat 20. If the seat 20 is eliminated, the operator may stand at an operator station proximate to the steering assembly 30.

In an example embodiment, the steering assembly 30 may include separately operable steering levers 34. The riding lawn care vehicle 10 may also include a cutting deck 40 having at least one cutting blade (e.g., two or three cutting blades) mounted therein. The cutting deck 40 may be positioned substantially rearward of a pair of front wheels 31 and substantially forward of a pair of rear wheels 32 in a position to enable the operator to cut grass using the cutting blade(s) when the cutting blade(s) are rotated below the cutting deck 40 when the cutting deck 40 is in a cutting position. However, in some alternative examples, the cutting deck 40 may be positioned in front of the front wheels 31. In some embodiments, a footrest 42 may also be positioned above the cutting deck 40 forward of the seat 20 to enable the operator to rest his or her feet thereon while seated in the seat 20. In embodiments that do not include the seat 20, the footrest 42 may form the operator station from which a standing operator controls the riding lawn care vehicle 10. When operating to cut grass, the grass clippings may be captured by a collection system, mulched, or expelled from the cutting deck 40 via either a side discharge or a rear discharge.

In the pictured example embodiment, an engine 50 of the riding lawn care vehicle 10 is disposed to the rear of a seated operator. However, in other example embodiments, the engine 50 could be in different positions such as in front of or below the operator. As shown in FIGS. 1A and 1B, the engine 50 may be operably coupled to one or more of the wheels 31 and/or 32 to provide drive power for the riding lawn care vehicle 10. The engine 50 is an example of one power unit (e.g., a petrol engine) that could power the riding lawn care vehicle 10, but other power units (e.g., an electric motor) may be used in other example embodiments. The engine 50, the steering assembly 30, the cutting deck 40, the seat 20, and other components of the riding lawn care vehicle 10 may be operably coupled to a frame 60 of the riding lawn care vehicle 10. The frame 60 may be a rigid structure configured to provide support, connectivity, and/or interoperability functions for various ones of the components of the riding lawn care vehicle 10.

In some example embodiments, the steering assembly 30 may be embodied as an assembly of metallic and/or other rigid components that may be welded, bolted, and/or otherwise attached to each other and operably coupled to the wheels of the riding lawn care vehicle 10 to which steering inputs are provided (e.g., rear wheels 32). For example, the steering assembly 30 may include or otherwise be coupled with hydraulic motors that independently power one or more drive wheels (e.g., rear wheels 32) on each respective side of the riding lawn care vehicle 10. When one of the steering levers 34 is pushed forward (e.g., away from the operator), the corresponding hydraulic motor may drive the corresponding wheel forward. When a steering lever 34 is pulled rearward (e.g., toward the operator as shown by the directional arrows 68 in FIG. 2), the corresponding hydraulic motor may drive the corresponding wheel (i.e., a corresponding one of the rear wheels 32) rearward. Thus, when both steering levers 34 are pushed forward the same amount, the riding lawn care vehicle 10 travels forward in substantially a straight line because approximately the same amount of forward drive input is provided to each drive wheel. When both steering levers 34 are pulled rearward the same amount, the riding lawn care vehicle 10 travels backward (e.g., rearward) in substantially a straight line because approximately the same amount of rearward drive input is provided to each drive wheel. When one steering lever 34 is pushed forward and the other steering lever 34 is pulled back, the riding lawn care vehicle 10 begins to turn in a circle and/or spin. Steering right and left may be accomplished by providing uneven amounts of input to the steering levers 34. Other steering control systems may be employed in some alternative embodiments.

Figure 2:
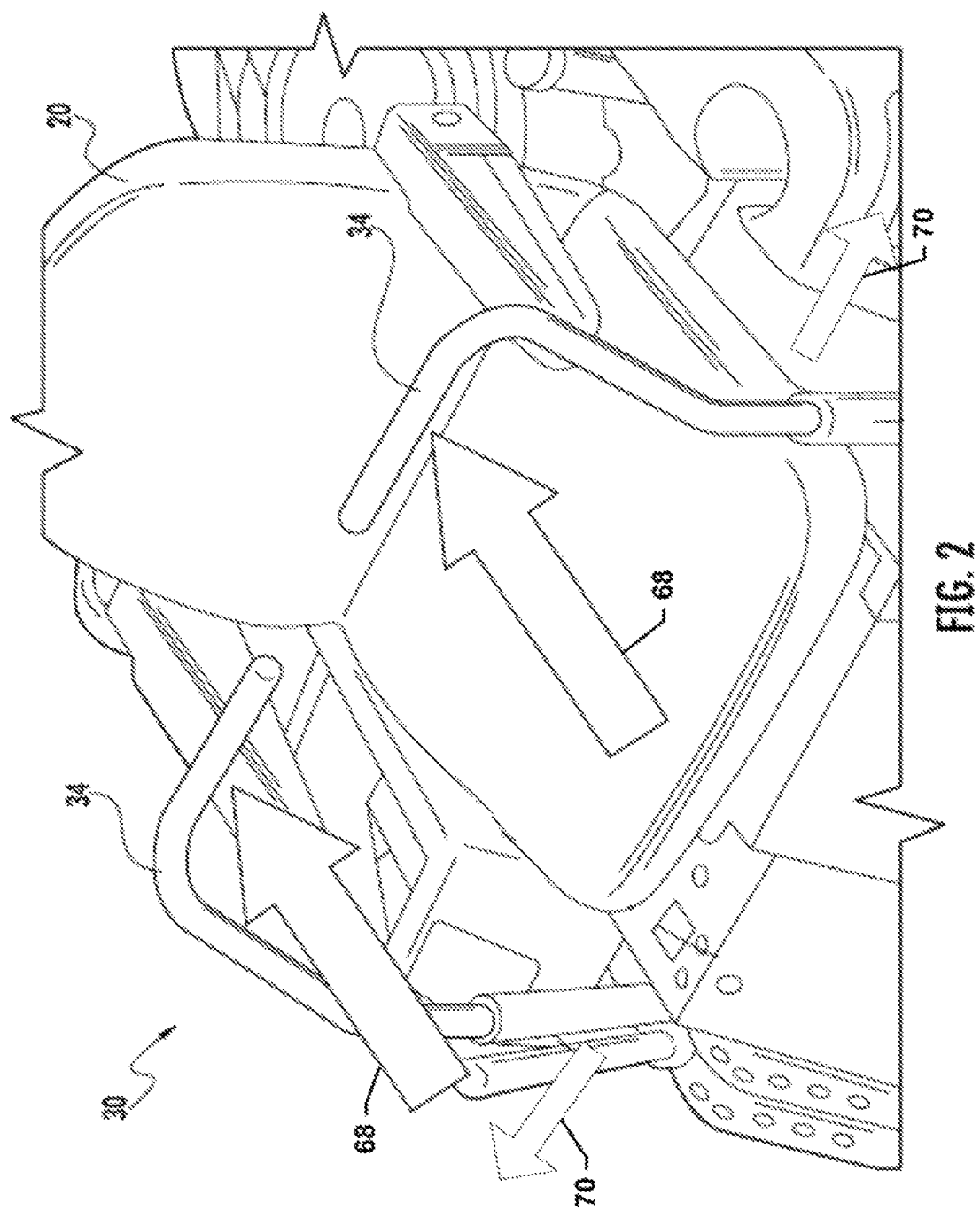
FIG. 2 illustrates a perspective view of a steering assembly with steering levers positioned to be pulled back for rearward propulsion according to an example embodiment.

Although the steering levers 34 are generally moved forward (i.e., opposite the direction of the arrows 68 shown in FIG. 2) or rearward (i.e., in the direction of the arrows 68 shown in FIG. 2) in any desirable combination while they are in the operating positions shown in FIGS. 1 and 2, it should be appreciated that the steering levers 34 may also be moved to an outboard position (e.g., in a non-operational state) by moving the steering levers 34 outwardly in the direction shown by arrows 70 in FIGS. 1B and 2. In this regard, each of the steering levers 34 may be operably coupled to respective lever mounts that may pivot to enable the steering levers 34 to move outwardly (e.g., to the outboard position) or inwardly (e.g., to an inboard and/or operating position). In some embodiments, when at least one of the steering levers 34 is pivoted outwardly, a parking brake may be applied so that the operator may easily mount or dismount the riding lawn care vehicle 10 and sit in or leave the seat 20.

Figure 3:
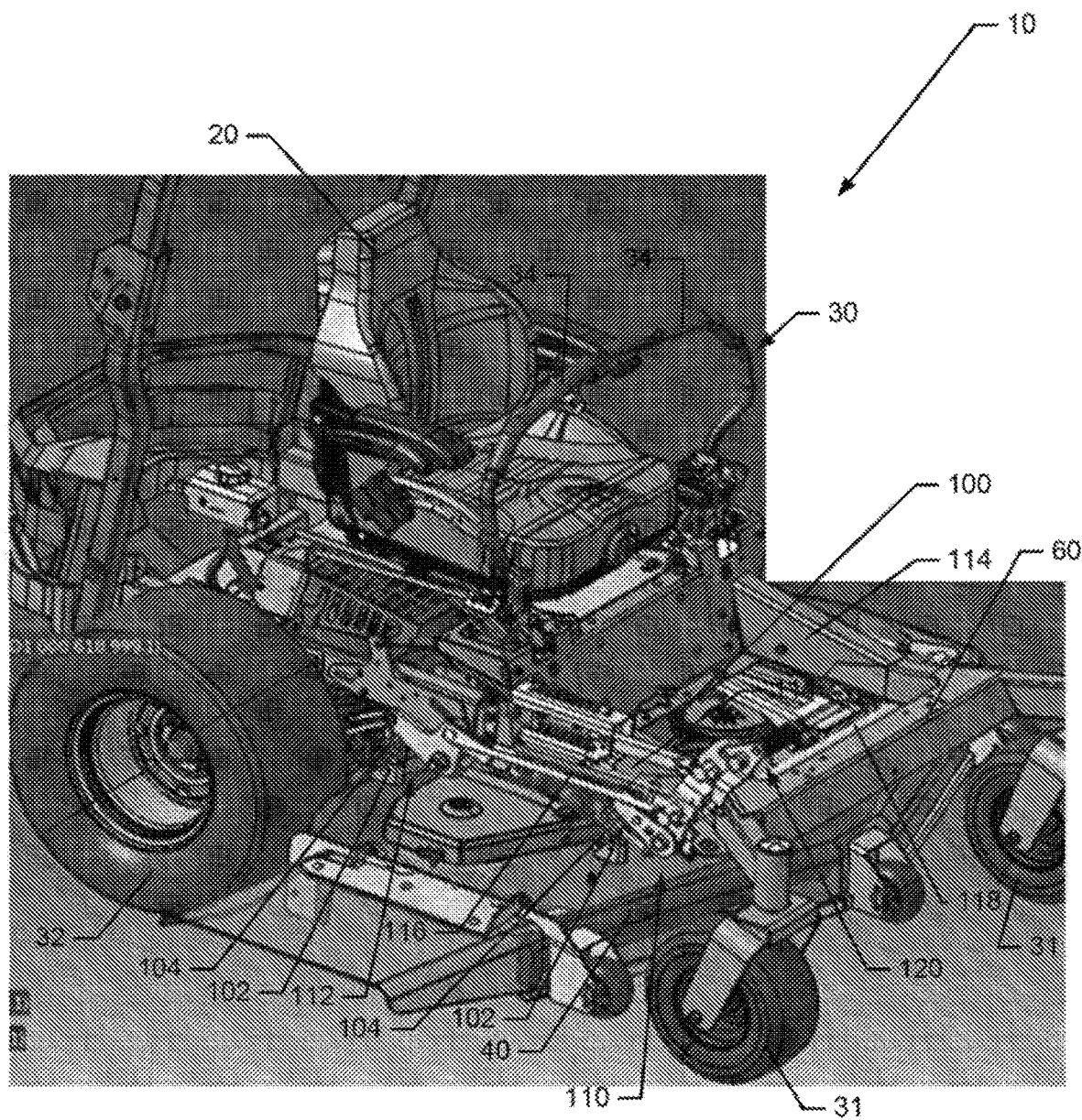
FIG. 3 illustrates a perspective view of the riding lawn care vehicle with a cutting deck height adjustment assembly according to an example embodiment.

FIG. 3 illustrates a perspective view of the riding lawn care vehicle 10 with additional details associated with components of a cutting deck height adjustment assembly 100 according to an example embodiment of an example embodiment. Of note, the height adjustment assembly 100 may include front and rear pivot assemblies 110 and 112 that are mirrored on both sides of the riding lawn care vehicle 10. Some components of the height adjustment assembly 100 that may be provided on only one side of the riding lawn care vehicle 10 may include a mode control assembly 150. For mirrored components, only one set may be shown in FIG. 3, so it should be appreciated that the other set of such mirrored components is similarly situated (e.g., position-wise and functionally) on the other side of the riding lawn care vehicle 10. Meanwhile, for any components that are provided only on one side, it should be appreciated that although such components are shown on one particular side (e.g., the right side) of the riding lawn care vehicle 10 in FIG. 3, such components could alternatively be placed along the opposite side (e.g., the left side) of the riding lawn care vehicle 10.

As shown in FIG. 3, the height adjustment assembly 100 may be operably coupled to the cutting deck 40 via brackets 102 that are operably coupled (e.g., welded or bolted) to the cutting deck 40. The brackets 102 may be configured to receive linking members 104 that are operably coupled to a front pivot assembly 110 and a rear pivot assembly 112 (which are mirrored on both sides of the riding lawn care vehicle 10). In the example of FIG. 3, the linking members 104 may be chains. However, in other examples, the linking members 104 may be rods or other suitable linkages. In an example embodiment, the front and rear pivot assemblies 110 and 112 may each be mirrored on right and left sides of the riding lawn care vehicle 10. More particularly, the front and rear pivot assemblies 110 and 112 may be operably coupled to the frame 60 via frame members 114 that extend forward toward the front wheels 31 from a portion of the frame 60 that supports the seat 20. The front pivot assembly 110 may be operably coupled to an operating assembly 120, which may include one or more foot pedals, levers, or other operating members.

As shown in FIG. 3, the front and rear pivot assemblies 110 and 112 may each be pivotally coupled to the frame member 114 on their respective side of the riding lawn care vehicle 10. A connecting arm 116 may be provided to synchronize pivoting of the front and rear pivot assemblies 110 and 112 to raise or lower the cutting deck 40 height. In this regard, for example, each of the front and rear pivot assemblies 110 and 112 may be embodied as a bell crank with a pivot point thereof pivotally coupled to the frame member 114. An arm of the bell crank that extends rearward may be operably coupled to the linking members 104 and an arm of the bell crank that extends forward may be operably coupled to the connecting arm 116.

When the operating assembly 120 is operated, the bell cranks associated with the front and rear pivot assemblies 110 and 112 on the right side of the riding lawn care vehicle 10 (in this example) each pivot in synchronization with each other. Meanwhile, the front pivot assemblies 110 on opposing sides of the riding lawn care vehicle 10 are operably coupled to each other by a cross linkage 118. The cross linkage 118 pivots with the front pivot assembly 110. Thus, when the front pivot assembly 110 on the right side of the riding lawn care vehicle 10 pivots, the corresponding front pivot assembly 110 on the left side is also made to pivot. The connecting arm 116 on the left side then also carries the rear pivot assembly 112 on the left side with the front pivot assembly 110. Thus, operation of the operating assembly 120 effectively makes all of the bell cranks associated with the front and rear pivot assemblies 110 and 112 rotate in synchronization with each other (via the connecting arms 116 on each side, and via the cross linkage 118) to either raise or lower the height of the cutting deck 40.

As can be appreciated from the disclosure of FIG. 3, the height adjustment assembly 100 can be used to select a specific height for the cutting deck 40 via the operating assembly 120. As such, the height adjustment assembly 100 may have a locked state in which the cutting deck 40 is "locked" at the selected height. The height adjustment assembly 100 may also have an unlocked state in which the height adjustment assembly 100 is not locked and therefore is capable of adjustment so that the selected height of the cutting deck 40 can be changed. However, in accordance with example embodiments, it may also be desirable to be able to transition the height adjustment assembly 100 into and out of a transport mode. When out of the transport mode, the height adjustment assembly 100 may either be in the locked or unlocked state at or transitioning to/from the selected height of the cutting deck 40. However, when the height adjustment assembly 100 is in the transport mode, the cutting deck 40 may be held at a transport height. In some examples, the transport height may be higher than the highest selectable height for the cutting deck 40 (i.e., the highest height that can be selected when the height adjustment assembly 100 is in the locked state). FIGS. 4-6 illustrate various views and perspectives of components of the height adjustment assembly 100 to facilitate descriptions of the transitions into and out of the locked and unlocked states and the transport mode.

Figure 4B:
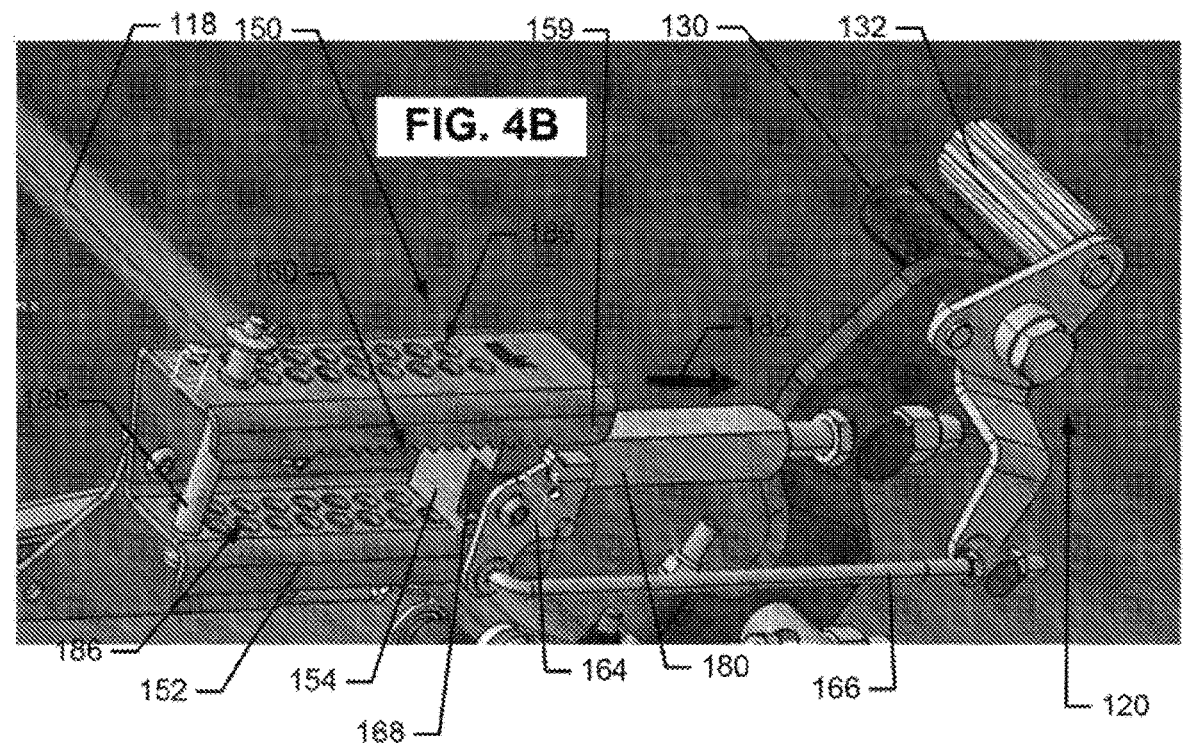
FIG. 4B illustrates an isolation view of components of the height adjustment assembly and operating assembly in an assembled state in accordance with an example embodiment.
Figure 4A:
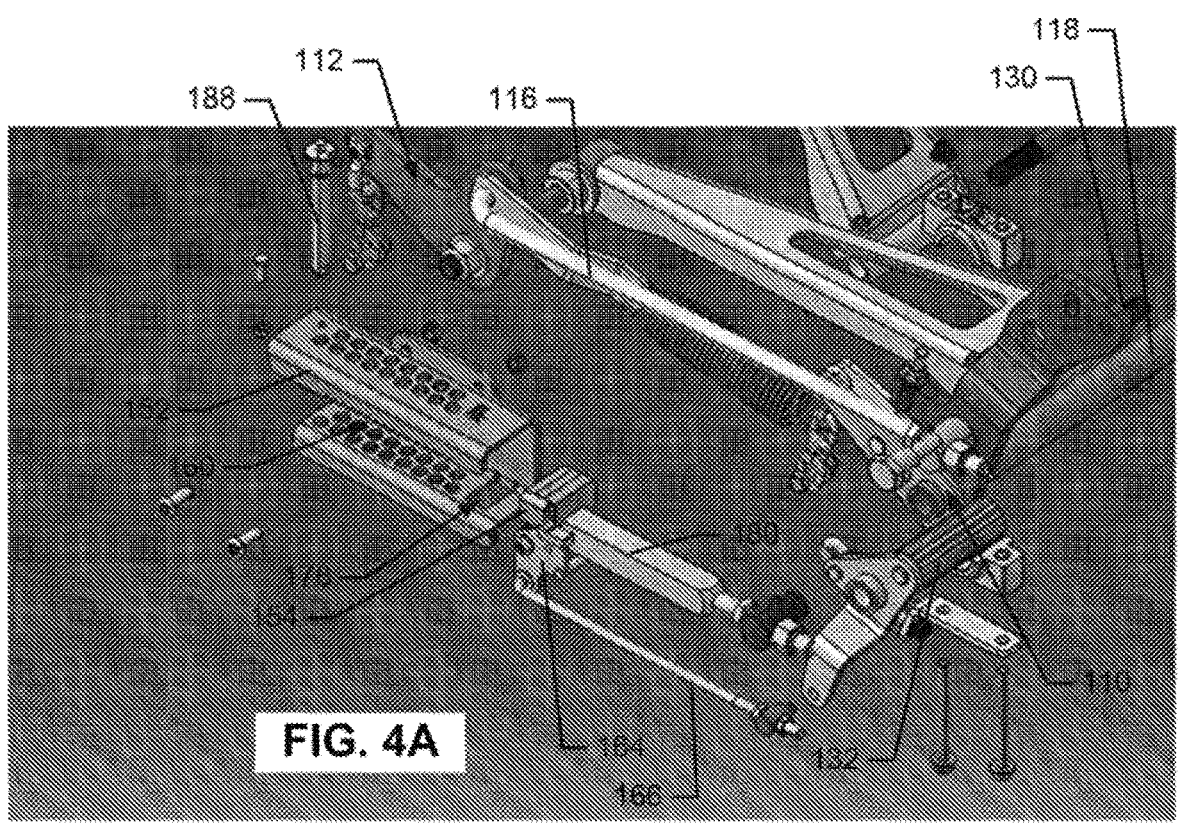
FIG. 4A illustrates an exploded perspective view of various components of a height adjustment assembly in accordance with an example embodiment.
Figure 4C:
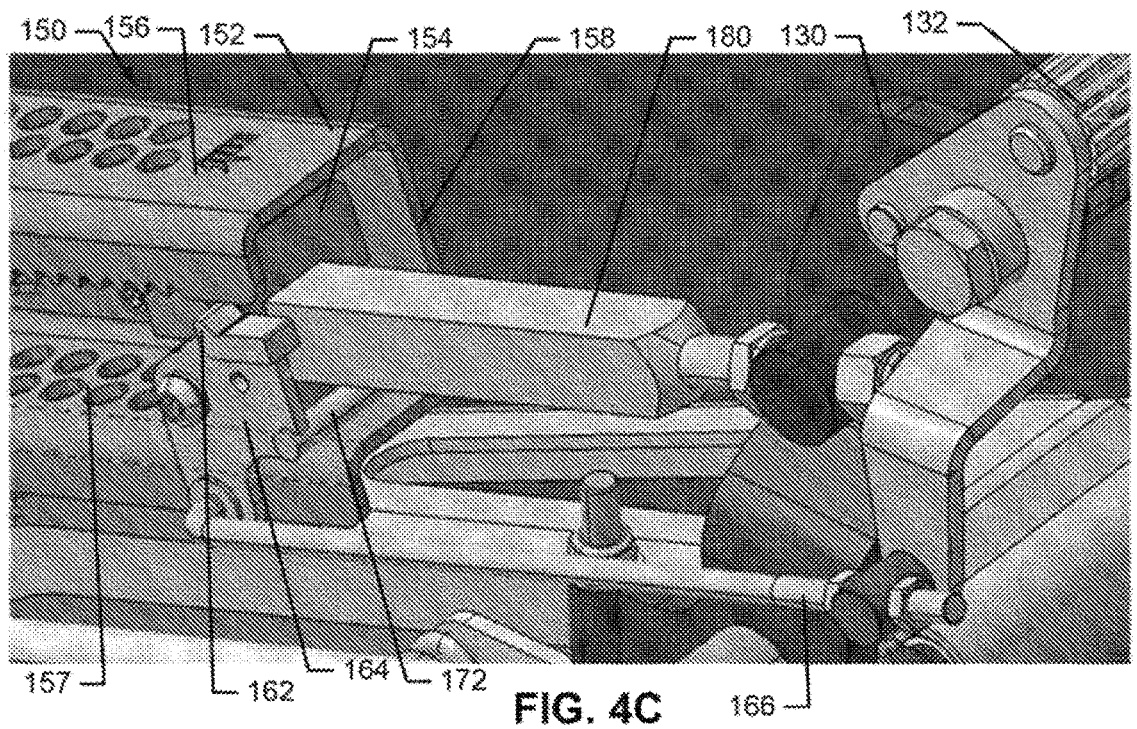
FIG. 4C illustrates a perspective view of the height adjustment assembly in the transport mode in accordance with an example embodiment.
Figure 4D:
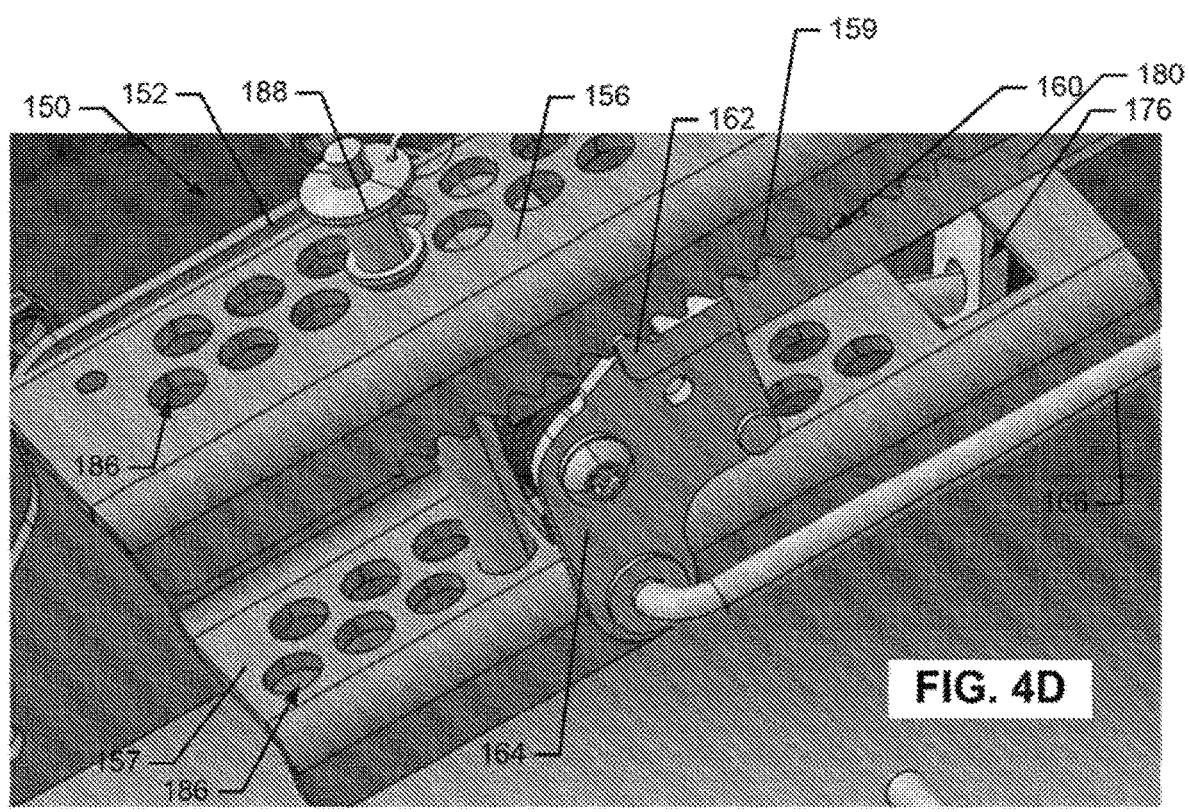
FIG. 4D illustrates a perspective view of the height adjustment assembly in the locked state in accordance with an example embodiment.
Figure 5A:
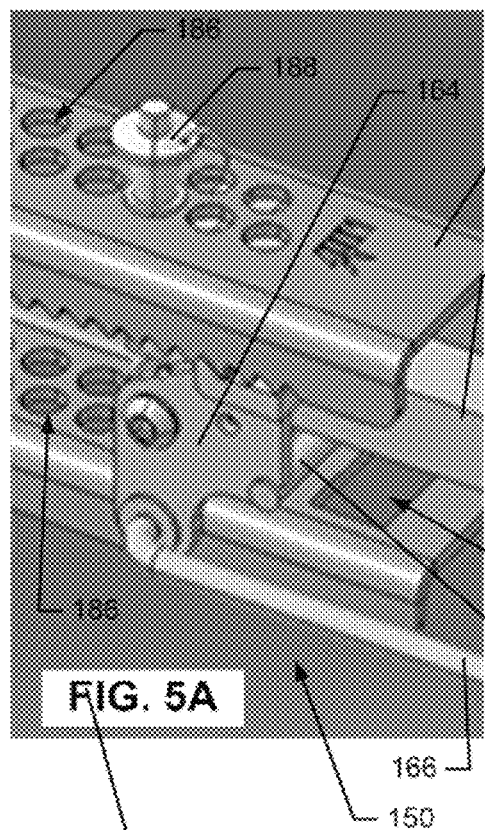
FIG. 5A illustrates another perspective view of the height adjustment assembly in the locked state in accordance with an example embodiment.
Figure 5B:
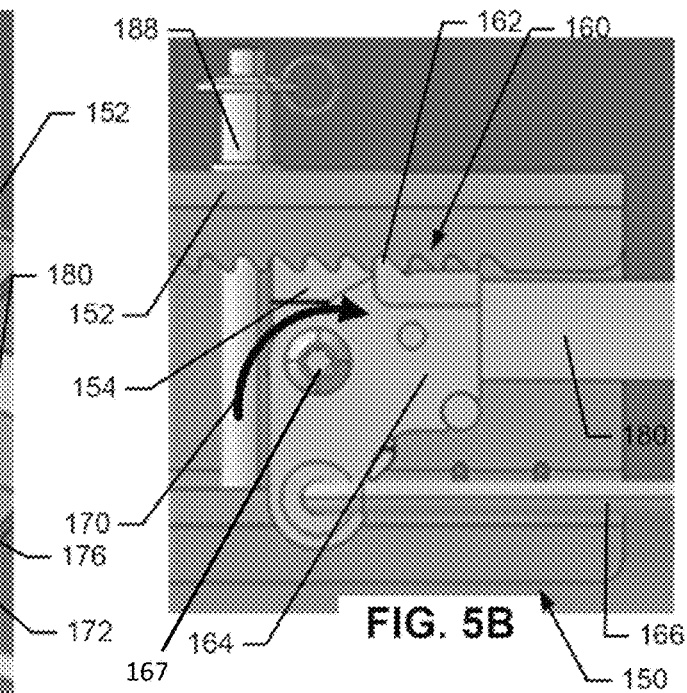
FIG. 5B illustrates a side view of the height adjustment assembly in the locked state in accordance with an example embodiment.
Figure 5C:
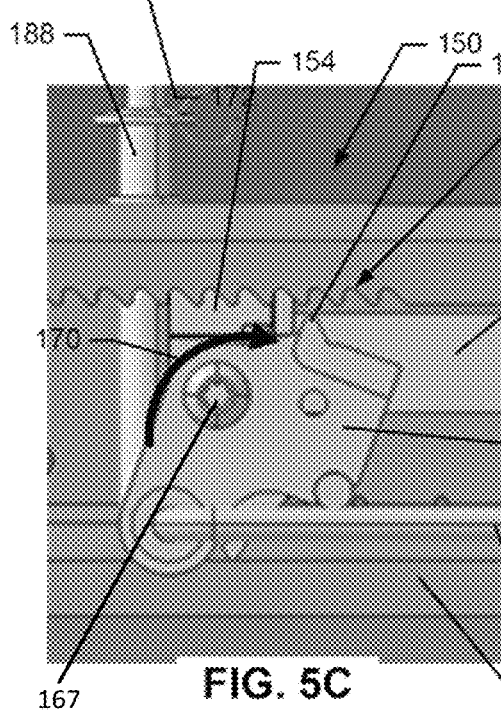
FIG. 5C illustrates the height adjustment assembly transitioned from the locked state of FIG. 5B into the unlocked state in accordance with an example embodiment.
Figure 5D:
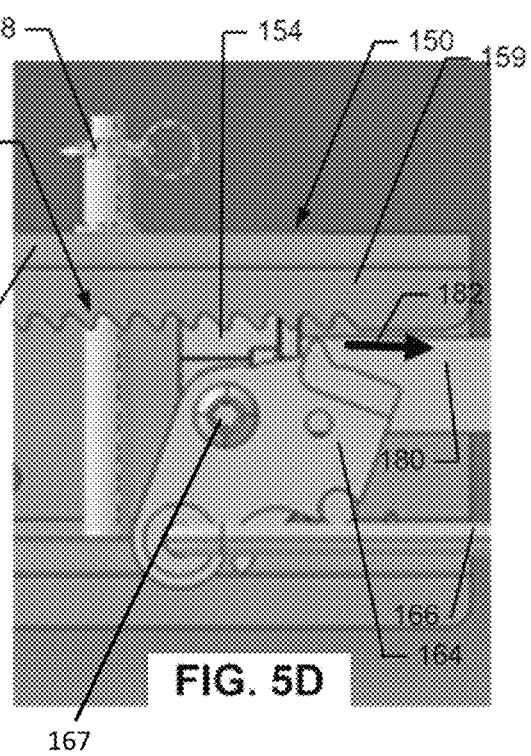
FIG. 5D is a side view of the height adjustment assembly in the unlocked state and undergoing a height adjustment in accordance with an example embodiment.

FIG. 4A, which is an exploded perspective view of various components of the height adjustment assembly 100 (and operating assembly 120), further illustrates structures associated with embodying some examples. FIG. 4B shows an isolation view of certain ones of the components of the height adjustment assembly 100 and operating assembly 120 in an assembled state and from another perspective. FIG. 4C shows a perspective view of the height adjustment assembly 100 in the transport mode, and FIG. 4D shows a perspective view of the height adjustment assembly 100 in the locked state in accordance with an example embodiment. FIG. 5A illustrates another perspective view of the height adjustment assembly 100 in the locked state, while FIG. 5B illustrates a side view of the height adjustment assembly 100 in the locked state. FIG. 5C illustrates the height adjustment assembly 100 transitioned from the locked state of FIG. 5B into the unlocked state. FIG. 5D is a side view of the height adjustment assembly 100 in the unlocked state and undergoing a height adjustment.

Figure 6A:
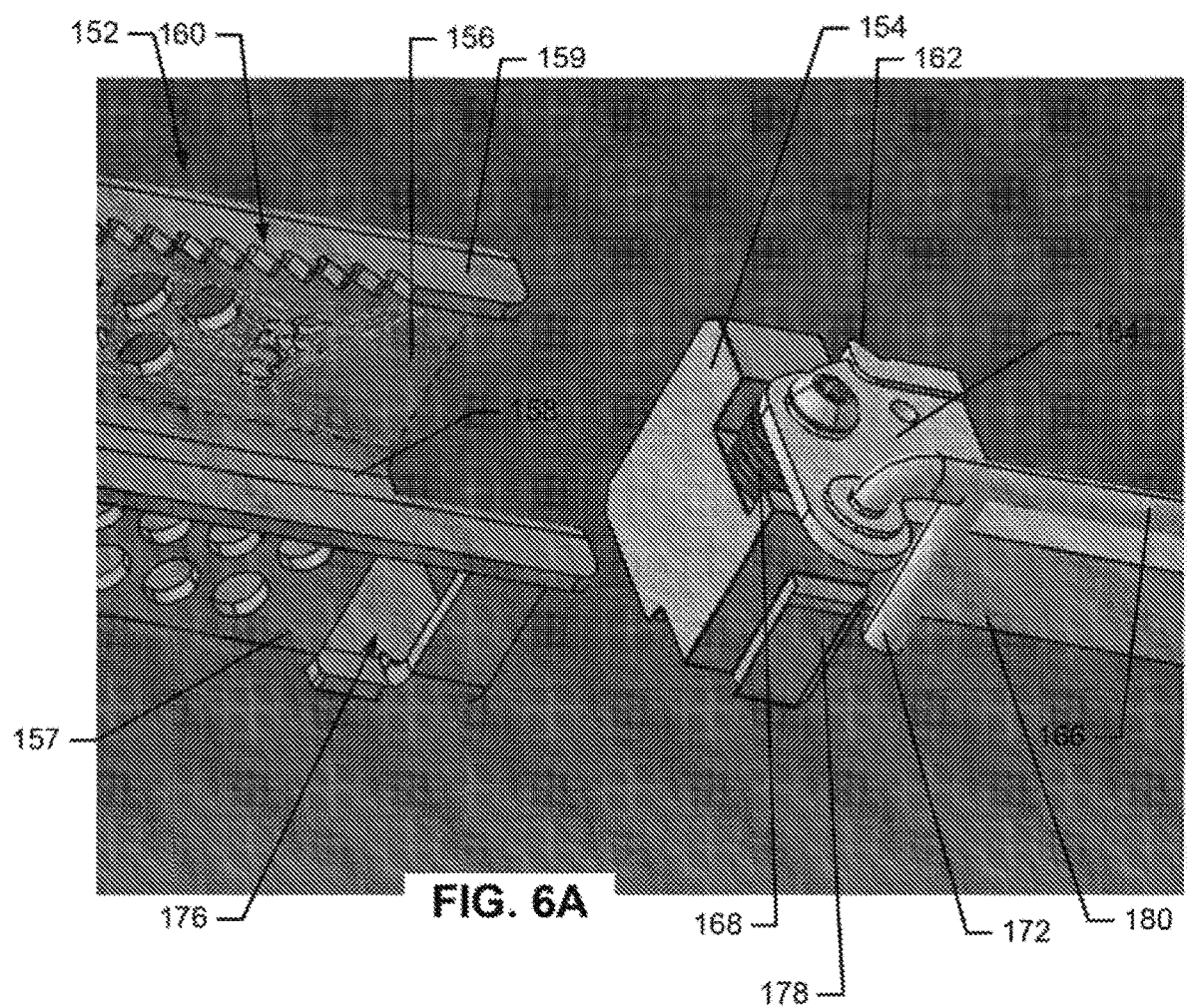
FIG. 6A illustrates an exploded view of some components of the height adjustment assembly associated with the transition to and from the transport mode in accordance with an example embodiment.
Figure 6B:
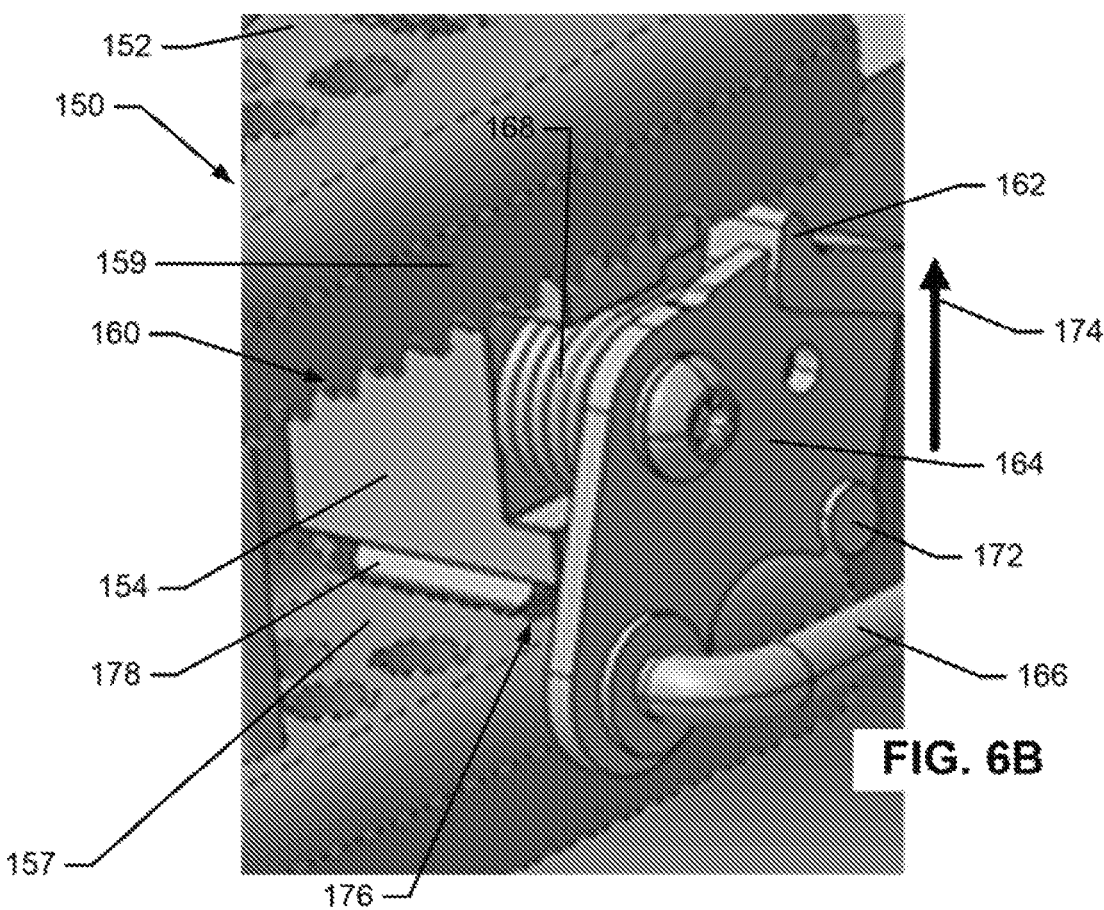
FIG. 6B illustrates a perspective view of the height adjustment assembly either immediately before going into or immediately after coming out of the transport mode in accordance with an example embodiment.
Figure 6C:
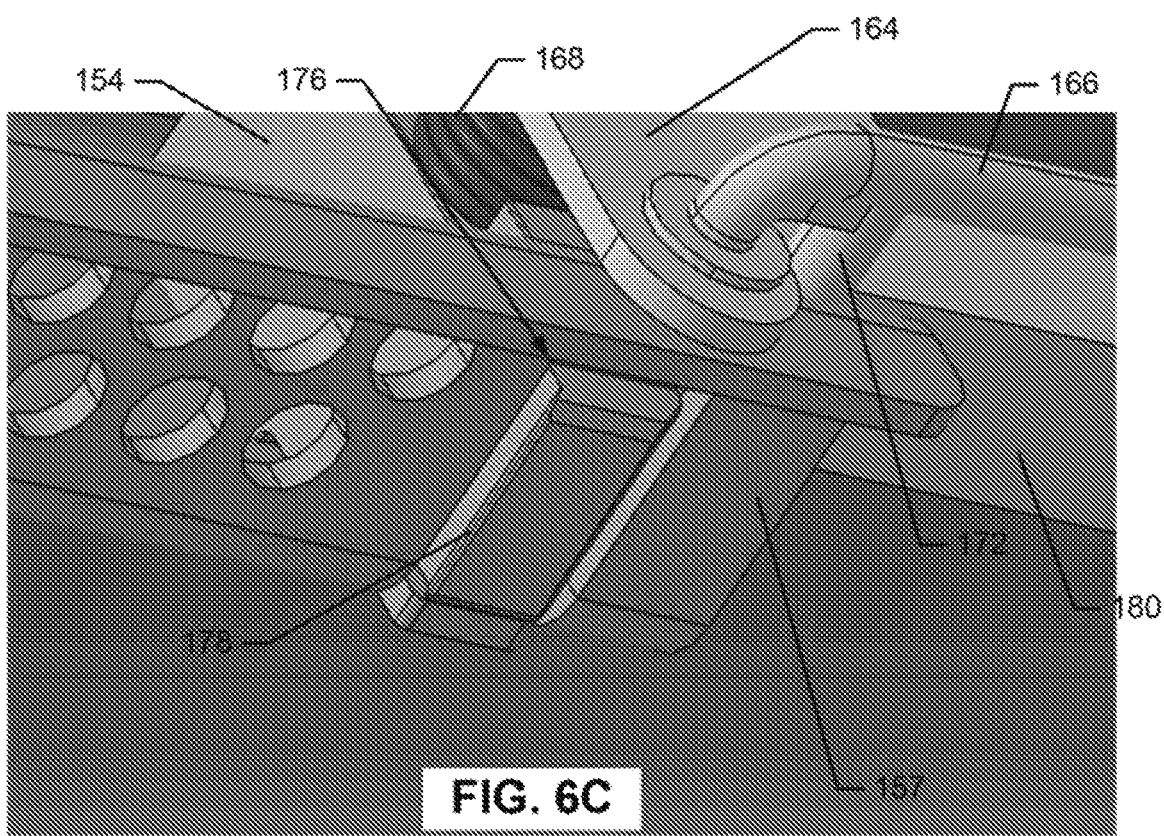
FIG. 6C illustrates a perspective view of some components of the height adjustment assembly in the transport mode in accordance with an example embodiment.

FIG. 6A illustrates an exploded view of some components of the height adjustment assembly 100 associated with the transition to and from the transport mode. FIG. 6B illustrates a perspective view of the height adjustment assembly 100 either immediately before going into or immediately after coming out of the transport mode. FIG. 6C illustrates a perspective view of some components of the height adjustment assembly 100 in the transport mode.

As shown in FIGS. 4A, 4B and 4C, the operating assembly 120 may include a main pedal 130 and a secondary pedal 132 (e.g., a toe pedal). The secondary pedal 132 may be operably coupled to the main pedal 130. Moreover, in some cases, the secondary pedal 132 may be pivotally coupled to the main pedal 130 at a location such that a pivot point about which the secondary pedal 132 pivots is disposed proximate to a distal end of the main pedal 132. The main pedal 130 may be operably coupled to the arm of the bell crank that extends forward for the front pivot assembly 110 on the right side of the riding lawn care vehicle 10 (in this example). The main pedal 130 may therefore be used to physically reposition the front pivot assembly 110, which correspondingly urges all of the other bell cranks associated with the front and rear pivot assemblies 110 and 112 to move via the connecting arms 116 and cross linkage 118, as described above. The operator can therefore carry the weight of the cutting deck 40 with the right leg (in this example) of the operator, and reposition the cutting deck 40 via the main pedal 130. However, such repositioning is only enabled when the height adjustment assembly 100 is not in the locked state.

In some cases, the transference of the height adjustment assembly 100 between the locked state (in which changing the position of the height of the cutting deck 40 is not possible—i.e., the cutting deck 40 height is temporarily fixed) and the unlocked state (in which changing the position of the height of the cutting deck 40 is possible) is controlled by the secondary pedal 132. In this regard, the secondary pedal 132 may have at least two functions in some cases. First, the secondary pedal 132 may shift the height adjustment assembly 100 between locked and unlocked states relative to selecting different height settings for the cutting deck 40. Second, the secondary pedal 132 may enable a shift of the height adjustment assembly 100 out of the transport mode. Thus, the operating assembly 120 may include multiple functions as well. In this regard, for example, the operating assembly 120 (via the secondary pedal 132) may control shifting into and out of both the locked state and the transport mode. The operating assembly 120 may also control changing of the selected height of the cutting deck 40.

Transitions between the locked and unlocked states, and transitions into and out of the transport mode, may be controlled by operation of the secondary pedal 132 to operate a mode control assembly 150. The mode control assembly 150 may be a part of the height adjustment assembly 100 specifically dedicated to interacting with the operating assembly 120 to control height selections when in the unlocked state, control transitions into and out of the locked/unlocked states, and control the transitions into and out of the transport mode.

The mode control assembly 150 may include a height gauge bracket 152 that is configured to receive a height block 154 therein. The height gauge bracket 152 may be an elongated member having an elongated passage formed therein to receive and retain the height block 154 while allowing the height block 154 to slidably move along a majority portion of the length of the elongated passage. In some examples, the height gauge bracket 152 may be made of steel or sheet metal that is formed to define the elongated passage between at least three sides that form a substantially C or U shaped cross section. Thus, for example, the height gauge bracket 152 may include a top member 156, a bottom member 157 facing the top member 156 on an opposing side of the elongated passage, and a side member 158 connecting the top member 156 to the bottom member 157, and extending substantially perpendicular to the directions of extension of each of the top and bottom members 156 and 157. The top member 156, bottom member 157 and side member 158 are best seen in FIGS. 4C and 6A.

The size of the height block 154 (and perhaps also the shape of the height block 154) may be such that the height block 154 is enabled to fit within the elongated passage and slide therein when not otherwise restrained from such movement. However, the height block 154 may be inhibited from moving outside of the elongated passage by a retaining portion 159 that may extend away from at least one of the top member 156 or the bottom member 157 in a direction substantially parallel to the direction of extension of the side member 158.

In an example embodiment, the retaining portion 159 (or some other part of the height gauge member 152) may include a rack 160. The rack 160 may define a series of teeth or projections that each correspond to a fixable position along the length of the height gauge member 152. In an example embodiment, a pawl 162 or other protruding member that is configured to be engageable with the rack 160 may be operably coupled to the height block 154. The pawl 162 may be provided at a portion of a pivot member 164 that is operably coupled to the height block 154 at a pivot axis 167 of the pivot member 164. The pivot member 164 may be a bell crank, cam or other pivotable member that is operably coupled to the secondary pedal 132 via a linkage 166. The linkage 166 may be operably coupled to an end of the secondary pedal 132 that is positioned opposite (with respect to the pivot axis of the secondary pedal 132) a portion of the secondary pedal 132 that is normally contacted by the foot of the operator. The linkage 166 may also be operably coupled to the pivot member 164 at an opposite end of the pivot member 164 to the end at which the pawl 162 is located.

As can be appreciated from this arrangement, operation of the secondary pedal 132, e.g., by the toe or foot of the operator, may cause transmission of a force through the linkage 166 to pivot the pivot member 164 relative to the height block 154. In an example embodiment, a biasing member 168 (e.g., a spring such as a torsion spring) may be provided to bias the pivot member 164 to a position where the pawl 162 engages the rack 160, although any desirable biasing position could be implemented. However, in one example, the biasing member 168 may bias the pivot member 164 such that the pawl 162 engages the rack 160. Thus, operation of the secondary pedal 132 may overcome the biasing to pivot the pivot member 164 in the direction of arrow 170 to remove the pawl 162 from engagement with the rack 160. FIGS. 5B and 5C show the transition from the locked state (FIG. 5B) to the unlocked state (FIG. 5C) that occurs responsive to movement of the pivot member 164 in the direction of arrow 170 to remove the pawl 162 from the rack 160.

As shown in FIGS. 4C, 6A, 6B and 6C the pivot member 164 may also be operably coupled to a lifting rod 172. When the pivot member 164 pivots in the direction of arrow 170, the lifting rod 172 may engage the height gauge bracket 152 to lift the height block 154 in the direction of arrow 174. In particular, the lifting rod 172 may exert a force on the bottom member 157 of the height gauge bracket 152 to push the height block 154 upward. As shown in FIGS. 4A, 4D, 5A, 6A, 6B and 6C, the height gauge bracket 152 may include a locking slot 176 disposed proximate to one end thereof within the bottom member 157. In the examples shown, the locking slot 176 may be disposed in the bottom member 157. A portion of the height block 154 (e.g., protrusion 178) may be sized to fit within the locking slot 176. Thus, for example, when the height block 154 is slid within the height gauge bracket 152 to a position where the protrusion 178 aligns with the locking slot 176, gravity may allow the protrusion 178 to fall within the locking slot 176 to lock the height block 154 within the height gauge bracket 152 (e.g., as shown in FIG. 6C). In an example embodiment, the locking of the height block 154 by virtue of the protrusion 178 being disposed within the locking slot 176 may transition the height adjustment assembly 100 into the transport mode. However, when the secondary pedal 132 is operated from the transport mode, the linkage 166 causes the pivot member 164 to pivot in the direction of arrow 170. The pivoting of the pivot member 170 causes the lifting rod 172 to press on the bottom member 157 to lift the height block 154 in the direction of arrow 174 (as shown in FIG. 6B) to lift the protrusion 178 out of the locking slot 176 as shown in FIG. 6B. In some cases, the rack 160 may terminate before the portion of the height gauge bracket 152 at which the locking slot 176 is located. Thus, the pawl 162, even though it is lifted within the elongated passage, will not engage any portion of the rack 160 when transitioning out of the transport mode.

For movement of the height block 154, during cutting deck 40 height selection, the height block 154 may be operably coupled to the main pedal 130 via a lifting rod 180. The lifting rod 180 may be connected to a portion of the main pedal 130 that moves in the same direction that the main pedal 130 moves when the operator depresses the main pedal 130. However, it should be appreciated that the main pedal 130 moves about an axis while the lifting rod 180 responsively moves only linearly. Thus, when the operator depresses the main pedal 130, the lifting rod 180 may also move with the main pedal 130 and correspondingly carry the height block 154. The height block 154 may then also be moved in the direction of arrow 182 (see FIGS. 4B and 5D) through the height gauge bracket 152 responsive to the movement of the lifting rod 180. As the operator releases pressure on the main pedal 130, the lifting rod 180 and height block 154 may be allowed to return to a direction opposite the direction of arrow 182. Thus, for example, the height adjustment assembly 100 may be in the locked state at a particular selected height, as shown in FIGS. 5A and 5B. The operator may depress the secondary pedal 132 to couple such movement to the pivot member 164 to cause the pivot member 164 to pivot in the direction of arrow 170 in FIG. 5B. The pivoting of the pivot member 164 in the direction of arrow 170 may remove the pawl 162 from engagement with the rack 160, as shown in FIG. 5C. The operator may then push the main pedal 130 to lift the cutting deck 40 to a higher height setting by moving the lifting rod 180 and correspondingly also moving the height block 154 in the direction of arrow 182, as shown in FIG. 5C.

As noted above, the main pedal 130 is also operably coupled to the front pivot assembly 110 to cause pivoting thereof, and raise or lower the height of the cutting deck 40 correspondingly. In an example embodiment, the top and bottom members 156 and 157 may each have receiving orifices 186 that are disposed at intervals (and in registration with each other from the top member 156 to the bottom member 157) along a length of the top and bottom members 156 and 157. A selector pin 188 may be disposed in any one of the receiving orifices 186 to define a maximum amount of movement along a direction opposite the direction of arrow 182 for the height block 154. Moreover, the weight of the cutting deck 40 may tend to move the height block 154 along the direction opposite the direction of arrow 182 due to gravity. Thus, the cutting deck 40 could theoretically rest at the height determined by the selector pin 188 due to gravity causing the height block 154 to rest against the selector pin 188, as shown in FIGS. 5A and 5B. However, bumps or other momentary forces could cause the cutting deck 40 to bounce if the height block 154 is not otherwise restrained at the corresponding location (and cutting deck 40 height). Accordingly, when a given height of the cutting deck 40 is selected (e.g., by positioning the selector pin 188 in selected receiving orifices 186 and allowing the height block 154 to rest against the selector pin 188), the pawl 162 may be engaged with the rack 160 at the corresponding position. In this regard, the biasing member 168 causes the pivot member 164 to pivot in a direction opposite the direction of arrow 170 when the secondary pedal 132 is released. The rotation of the pivot member 164 opposite the direction of arrow 170 causes the pawl 162 to engage the rack 160 at the corresponding location. The engagement of the pawl 162 with the rack 160 places the height adjustment assembly 100 in the locked state to maintain a corresponding cutting deck 40 height. As discussed above, disengagement of the pawl 162 from the rack 160 places the height adjustment assembly 100 in the unlocked state to permit cutting deck 40 height adjustment. Meanwhile, when the height adjustment assembly 100 is in the unlocked state, if the height block 154 moves to a position where the protrusion 178 aligns with the locking slot 176, the protrusion 178 will fall (by gravity) into the locking slot 176 to lock the height adjustment assembly 100 in the transport mode. The cutting deck 40 will therefore be retained at a height that is higher than a highest possible cutting deck 40 height position for operational purposes.

Thus, the operator can move the position of the height block 154 by operation of the main pedal 130 when only when the height adjustment assembly 100 is in the unlocked state. The transfer into the unlocked state is accomplished by operating the secondary pedal 132. The transfer into the locked state is accomplished by spring return (e.g., via the biasing member 168) when the secondary pedal 132 is released. If the operator transitions to the unlocked state and pushes the main pedal 130 to the point at which the protrusion 178 aligns with the locking slot 176, the height block 154 will fall into the locking slot 176 (at least the protrusion 178 will) to transition the height adjustment assembly 100 into the transport mode. Transitioning out of the transport mode is again controlled by the secondary pedal 132. In this regard, the secondary pedal 132 is depressed to cause the lifting bar 172 to push on the bottom member 157 to lift the protrusion 178 out of the locking slot 176 to allow the height block 154 to move in the direction opposite arrow 182 to a selected height position (e.g., determined by the selector pin 188).

Accordingly, some example embodiments may enable the ability to transition out of the locked state and also out of the transport mode with a single, multi-purpose operating assembly. In an example embodiment, a riding lawn care vehicle may therefore be provided. The riding lawn care vehicle may include a frame, a power unit, and a cutting deck. The frame may be operably coupled to wheels of the riding lawn care vehicle. The power unit may be operably coupled to the wheels to provide drive power to the wheels. The cutting deck may be selectively powered by the power unit and operably coupled to the frame via a height adjustment assembly. The height adjustment assembly may be configured, based on actuation of an operating assembly, to be selectively transitioned into and out of a locked state in which the cutting deck is retained at a selected height, and selectively transitioned out of a transport mode.

The riding lawn care vehicle (or height adjustment assembly) of some embodiments may include additional features that may be optionally added either alone or in combination with each other. For example, in some embodiments, (1) the operating assembly may include a main pedal and a secondary pedal. The main pedal may be configured to enable movement of the cutting deck to the selected height when the height adjustment assembly is out of the locked state. The secondary pedal may be configured to be actuated to transition the height adjustment assembly both out of the locked state and out of the transport mode. In some cases, (2) the secondary pedal is pivotally mounted to the main pedal. In an example embodiment, (3) the operating assembly may be operably coupled to a height block that is slidable within a height gauge bracket to define the selected height based on a position of the height block within a range of locations within the height gauge bracket. In some examples, (4) the height block moves responsive to operation of the main pedal when the height adjustment assembly is out of the locked state and the transport mode. In an example embodiment, (5) the height block may include a protrusion and the height gauge bracket may include a locking slot. Responsive to alignment of the protrusion with the locking slot, the protrusion of the height block may fall due to gravity into the locking slot to transition the height adjustment assembly to the transport mode. In some examples, (6) the locking slot may be disposed at a portion of the height gauge bracket that is outside the range of locations. In an example embodiment, (7) the height block may be operably coupled to a pivot member that includes a lifting bar. Responsive to actuation of the secondary pedal, the lifting bar may lift the protrusion out of the locking slot to transition the height adjustment assembly out of the transport mode. In some examples, (8) a biasing member may be provided to bias the pivot member to a position corresponding to the locked state of the height adjustment assembly. In an example embodiment, (9) the height gauge bracket may include a rack defining the range of locations. The height block may be operably coupled to a pivot member having a pawl disposed at a portion of the pivot member. The pawl may engage the rack to retain the height block within the height gauge bracket at the selected height in the locked state. In some cases, (10) the pivot member may be operably coupled to the secondary pedal to rotate the pawl out of engagement with the rack responsive to actuation of the secondary pedal to transition the height adjustment assembly out of the locked state.

In some embodiments, any or all of (3) to (10) may be employed in addition to the optional modifications or augmentations described below. For example, in some embodiments, the height gauge bracket may include a plurality of pairs of receiving orifices disposed on opposing faces of a top member and bottom member of the height gauge bracket. A selector pin may be configured to fit in a selected one of the pairs of receiving orifices to define the selected height. Alternatively or additionally, the riding lawn care vehicle may be a riding lawn mower.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits, or solutions to problems are described herein, it should be appreciated that such advantages, benefits, and/or solutions may be applicable to some example embodiments, but not necessarily all example embodiments. Thus, any advantages, benefits, or solutions described herein should not be thought of as being critical, required, or essential to all embodiments or to that which is claimed herein. Although specific terms are employed herein, they are used in a generic and descriptive sense only and not for purposes of limitation.

That which is claimed:

1. A riding lawn care vehicle comprising:
    a frame operably coupled to wheels of the riding lawn care vehicle;
    a power unit operably coupled to the wheels to provide drive power to the wheels; and
    a cutting deck selectively powered by the power unit and operably coupled to the frame via a height adjustment assembly, the height adjustment assembly being configured, based on actuation of an operating assembly, to be:
        selectively transitioned into and out of a locked state in which the cutting deck is retained at a selected height, and
        selectively transitioned out of a transport mode,
    wherein the operating assembly comprises a main pedal and a secondary pedal,
    wherein the main pedal is configured to enable movement of the cutting deck to the selected height when the height adjustment assembly is out of the locked state,
    wherein the secondary pedal is configured to be actuated to transition the height adjustment assembly both out of the locked state and out of the transport mode, and
    wherein the operating assembly is operably coupled to a height block that is slidable within a height gauge bracket to define the selected height based on a position of the height block within a range of locations within the height gauge bracket.

2. The riding lawn care vehicle of claim 1, wherein the secondary pedal is pivotally mounted to the main pedal.

3. The riding lawn care vehicle of claim 1, wherein the height block moves responsive to operation of the main pedal when the height adjustment assembly is out of the locked state and the transport mode.

4. The riding lawn care vehicle of claim 3, wherein the height block comprises a protrusion and the height gauge bracket comprises a locking slot,
wherein responsive to alignment of the protrusion with the locking slot, the protrusion of the height block falls due to gravity into the locking slot to transition the height adjustment assembly to the transport mode.

5. The riding lawn care vehicle of claim 4, wherein the locking slot is disposed at a portion of the height gauge bracket that is outside the range of locations.

6. The riding lawn care vehicle of claim 4, wherein the height block is operably coupled to a pivot member that comprises a lifting bar, wherein responsive to actuation of the secondary pedal, the lifting bar lifts the protrusion out of the locking slot to transition the height adjustment assembly out of the transport mode.

7. The riding lawn care vehicle of claim 6, wherein a biasing member is provided to bias the pivot member to a position corresponding to the locked state of the height adjustment assembly.

8. The riding lawn care vehicle of claim 1, wherein the height gauge bracket comprises a rack defining the range of locations, wherein the height block is operably coupled to a pivot member having a pawl disposed at a portion of the pivot member, wherein the pawl engages the rack to retain the height block within the height gauge bracket at the selected height in the locked state.

9. The riding lawn care vehicle of claim 8, wherein the pivot member is operably coupled to the secondary pedal to rotate the pawl out of engagement with the rack responsive to actuation of the secondary pedal to transition the height adjustment assembly out of the locked state.

10. The riding lawn care vehicle of claim 1, wherein the height gauge bracket comprises a plurality of pairs of receiving orifices disposed on opposing faces of a top member and bottom member of the height gauge bracket, and wherein a selector pin is configured to fit in a selected one of the pairs of receiving orifices to define the selected height.

11. The riding lawn care vehicle of claim 1, wherein the riding lawn care vehicle is a riding lawn mower.

12. A height adjustment assembly of a riding lawn care vehicle, wherein the riding lawn care vehicle comprises:
a frame operably coupled to wheels of the riding lawn care vehicle, and
a cutting deck operably coupled to the frame via the height adjustment assembly, the height adjustment assembly comprising an operating assembly that is actuatable to selectively transition the height adjustment assembly into and out of a locked state in which the cutting deck is retained at a selected height, and selectively transition the height adjustment assembly out of a transport mode,
wherein the operating assembly comprises a main pedal and a secondary pedal,
wherein the main pedal is configured to enable movement of the cutting deck to the selected height when the height adjustment assembly is out of the locked state,
wherein the secondary pedal is configured to be actuated to transition the height adjustment assembly both out of the locked state and out of the transport mode, and
wherein the operating assembly is operably coupled to a height block that is slidable within a height gauge bracket to define the selected height based on a position of the height block within a range of locations within the height gauge bracket.

13. The height adjustment assembly of claim 12,
wherein the secondary pedal is pivotally mounted to the main pedal.

14. The height adjustment assembly of claim 12, wherein the height block moves responsive to operation of the main pedal when the height adjustment assembly is out of the locked state and the transport mode.

15. The height adjustment assembly of claim 14, wherein the height block comprises a protrusion and the height gauge bracket comprises a locking slot,
wherein responsive to alignment of the protrusion with the locking slot, the protrusion of the height block falls due to gravity into the locking slot to transition the height adjustment assembly to the transport mode,
wherein the locking slot is disposed at a portion of the height gauge bracket that is outside the range of locations,
wherein the height block is operably coupled to a pivot member that comprises a lifting bar, wherein responsive to actuation of the secondary pedal, the lifting bar lifts the protrusion out of the locking slot to transition the height adjustment assembly out of the transport mode, and
wherein a biasing member is provided to bias the pivot member to a position corresponding to the locked state of the height adjustment assembly.

16. The height adjustment assembly of claim 12, wherein the height gauge bracket comprises a rack defining the range of locations, wherein the height block is operably coupled to a pivot member having a pawl disposed at a portion of the pivot member, wherein the pawl engages the rack to retain the height block within the height gauge bracket at the selected height in the locked state.

17. The height adjustment assembly of claim 16, wherein the pivot member is operably coupled to the secondary pedal to rotate the pawl out of engagement with the rack responsive to actuation of the secondary pedal to transition the height adjustment assembly out of the locked state; and
wherein the height gauge bracket comprises a plurality of pairs of receiving orifices disposed on opposing faces of a top member and bottom member of the height gauge bracket, and wherein a selector pin is configured to fit in a selected one of the pairs of receiving orifices to define the selected height.

* * * * *